United States Patent
Deng et al.

(10) Patent No.: US 12,368,608 B2
(45) Date of Patent: Jul. 22, 2025

(54) RECYCLING CURRENT IN DATA TRANSMISSION

(71) Applicant: ABB Schweiz AG, Baden (CH)

(72) Inventors: Chengkun Deng, Zhejiang (CN); Huan Shi, Zhejiang (CN); Wei Liu, Zhejiang (CN)

(73) Assignee: ABB SCHWEIZ AG, Baden (CH)

( * ) Notice: Subject to any disclaimer, the term of this patent is extended or adjusted under 35 U.S.C. 154(b) by 262 days.

(21) Appl. No.: 18/249,461

(22) PCT Filed: Dec. 10, 2020

(86) PCT No.: PCT/CN2020/135103
§ 371 (c)(1),
(2) Date: Apr. 18, 2023

(87) PCT Pub. No.: WO2022/120673
PCT Pub. Date: Jun. 16, 2022

(65) Prior Publication Data
US 2023/0418362 A1    Dec. 28, 2023

(51) Int. Cl.
| | |
|---|---|
| *H04L 12/10* | (2006.01) |
| *G06F 1/3234* | (2019.01) |
| *G06F 1/3296* | (2019.01) |
| *H04B 3/54* | (2006.01) |

(52) U.S. Cl.
CPC ............ *H04L 12/10* (2013.01); *G06F 1/3243* (2013.01); *G06F 1/3296* (2013.01); *H04B 3/548* (2013.01)

(58) Field of Classification Search
CPC ......... H04L 12/10; G06F 1/32; G06F 1/3243; G06F 1/3296; H04B 3/548
USPC ................. 333/17.2, 12; 455/574, 572, 73
See application file for complete search history.

(56) References Cited

U.S. PATENT DOCUMENTS

| | | |
|---|---|---|
| 6,512,370 B1 | 1/2003 | James |
| 7,800,414 B2 * | 9/2010 | Oh ...................... H04L 25/0294 327/108 |
| 10,333,742 B1 | 6/2019 | Bhagwat |
| 11,233,393 B2 * | 1/2022 | Nagatani .................. H04B 3/02 |
| 2004/0123197 A1 | 6/2004 | Sunter |
| 2016/0054777 A1 | 2/2016 | Dwelley et al. |
| 2016/0308683 A1 | 10/2016 | Pischl et al. |

FOREIGN PATENT DOCUMENTS

CN    110022275 A    7/2019

* cited by examiner

*Primary Examiner* — Hai L Nguyen
(74) *Attorney, Agent, or Firm* — GREENBERG TRAURIG, LLP

(57) ABSTRACT

Embodiments of present disclosure relates to an electronic device and a method for current recycling. The electronic device comprises a transmission line, a bias resistor and a DC bias electrical connection. The transmission line is configured to transmit data. The bias resistor is coupled to the transmission line. The DC bias electrical connection is coupled between the bias resistor and a load at a terminal bias voltage. The DC bias electrical connection is configured to provide the bias resistor with the terminal bias voltage in case that DC bias current flows through the transmission line. By utilizing embodiments herein, the electronic device recycles current during data transmission to save power.

15 Claims, 5 Drawing Sheets

RECYCLING CURRENT IN DATA TRANSMISSION

CROSS-REFERENCE TO RELATED APPLICATIONS

This is a national stage application claiming priority to International patent application Serial No.: PCT/CN2020/135103, filed on Dec. 10, 2020; which is herein incorporated by reference in its entirety.

TECHNICAL FIELD

Example embodiments of the present disclosure generally relate to a technology of current recycling and more particularly, to an electronic device and a method for recycling current in a data transmission system.

BACKGROUND

In wired data transmission systems, data is generally transmitted from a transmitter to a receiver via a data transmission line. In some cases, the data transmission line needs to be biased at a certain DC to facilitate the data transmission. For example, in a positive emitter-biased logic (PECL) system, the transmission line may be biased at a DC voltage of 5V or 3.3 V.

In conventional approaches, the transmission line is generally coupled to a bias resistor, and the bias resistor is in turn coupled to a terminal bias voltage source providing a terminal DC bias voltage to the bias resistor. The terminal DC bias voltage (terminal bias voltage) is generally lower than the DC bias voltage of the transmission line. For example, the transmission line may be biased at 3.3V, and the terminal bias voltage received at the bias resistor may be 1.3V, such that a current flows through the bias resistor.

During operation, the terminal bias voltage source consumes power, and heat is generated by the terminal bias voltage source and the bias resistor. The accumulated heat may cause potential damages, such as aging or failure to the wired data transmission system, which is usually implemented on a circuit board. Improved solutions of data transmission systems are still needed.

SUMMARY

Example embodiments of the present disclosure propose a solution of electronic device and a method for recycling current.

In a first aspect, it is provided an electronic device. The electronic device comprises a transmission line, a bias resistor and a DC bias electrical connection. The transmission line is configured to transmit data. The bias resistor is coupled to the transmission line. The DC bias electrical connection is coupled between the bias resistor and a load at a terminal bias voltage. The DC bias electrical connection is configured to provide the bias resistor with the terminal bias voltage in case that DC bias current flows through the transmission line.

In a second aspect, it is provided a method for recycling current in data transmission. The method comprises transmitting data through a transmission line coupled to a bias resistor. The method further comprises providing the bias resistor with a terminal bias voltage at a load via a DC bias electrical connection.

In a third aspect, it is provided a method for manufacturing an electronic device. The method comprises providing a transmission line configured to transmit data. The method further comprises providing a bias resistor coupled to the transmission line. The method further comprises providing a DC bias electrical connection coupled between the bias resistor and a load at a terminal bias voltage. The DC bias electrical connection is configured to provide the bias resistor with the terminal bias voltage in case that DC bias current flows through the transmission line.

According to the embodiments of the present disclosure, the solution according to embodiments of the present disclosure is to save power consumption and reduce heat accumulation in the wired data transmission system.

BRIEF DESCRIPTION OF THE DRAWINGS

Through the following detailed descriptions with reference to the accompanying drawings, the above and other objectives, features and advantages of the example embodiments disclosed herein will become more comprehensible. In the drawings, several example embodiments disclosed herein will be illustrated in an example and in a non-limiting manner, wherein.

Throughout the drawings, the same or corresponding reference symbols refer to the same or corresponding parts.

DETAILED DESCRIPTION

Figure 1:
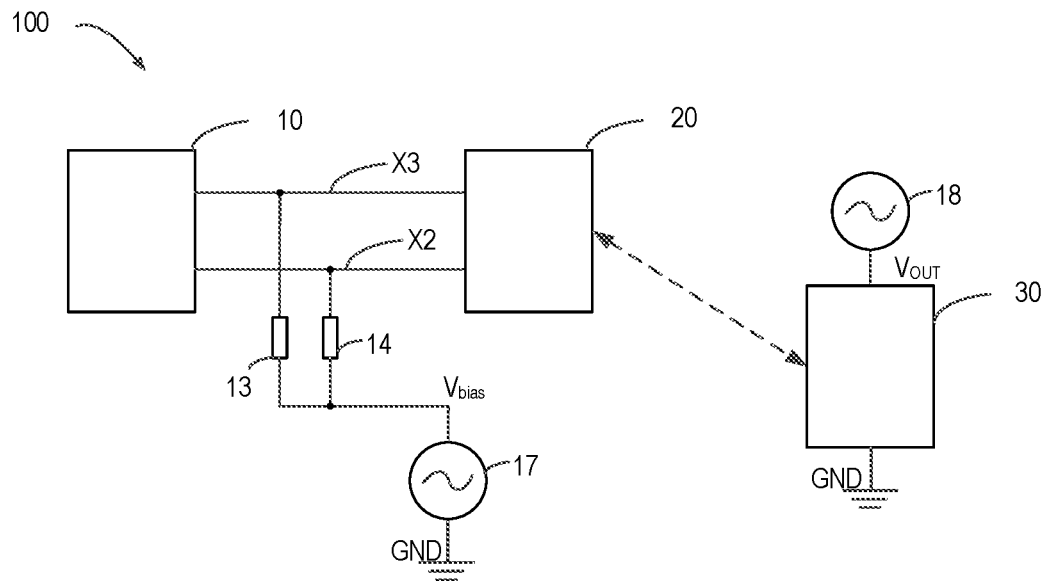
FIG. 1 illustrates a block diagram of a conventional electronic device.

The subject matter described herein will now be discussed with reference to several example embodiments. These embodiments are discussed only for the purpose of enabling those skilled persons in the art to better understand and thus implement the subject matter described herein, rather than suggesting any limitations on the scope of the subject matter.

The term "comprises" or "includes" and its variants are to be read as open terms that mean "includes, but is not limited to." The term "or" is to be read as "and/or" unless the context clearly indicates otherwise. The term "based on" is to be read as "based at least in part on." The term "being operable to" is to mean a function, an action, a motion or a state can be achieved by an operation induced by a user or an external mechanism. The term "one embodiment" and "an embodiment" are to be read as "at least one embodiment." The term "another embodiment" is to be read as "at least one other embodiment."

Unless specified or limited otherwise, the terms "mounted," "connected," "supported," and "coupled" and variations thereof are used broadly and encompass direct and indirect mountings, connections, supports, and couplings. Furthermore, "connected" and "coupled" are not restricted to physical or mechanical connections or couplings. In the description below, like reference numerals and labels are used to describe the same, similar or corresponding parts in the Figures. Other definitions, explicit and implicit, may be included below.

As describe above, conventional approaches for proving a terminal bias voltage to a data transmission line of a data transmission system requires an independent DC terminal bias voltage source. FIG. 1 illustrates a block diagram of a conventional electronic device 100. The electronic device 100 comprises a data transmitter 10, a data receiver 20 and a pair of differential data transmission lines X2 and X3 coupling the data transmitter 10 to the data receiver 20. The data may be transmitted from the data transmitter 10 to the data receiver 20 via the pair of differential data transmission lines X2 and X3.

The electronic device 100 further comprises a load 30, such as a micro controlling unit (MCU) or other electronic components. In this case, the load 30 may be directly or indirectly coupled to the data receiver 20.

The electronic device 100 further comprises a first voltage source 18 to supply a voltage $V_{OUT}$ to the load 30, such that the load 30 may operate with the supplied voltage $V_{OUT}$. In an embodiment, the first voltage source 18 may be a DC-DC converter or low dropout regulator (LDO). It should be known that the load 30 may be a set of electronic components supplied with various voltages. Thus, at least one voltage converter (not shown) may be provided to convert the voltage $V_{OUT}$ from the first voltage source 18 to the various voltages and to provide the various voltages to the set of electronic components.

The electronic device 100 further comprises a second voltage source 17 to provide a terminal bias voltage $V_{bias}$ via a pair of bias resistors 13 and 14. For the purpose of data transmission, the data transmission lines X2 and X3 may be biased at a certain DC line voltage, which is usually greater than the terminal bias voltage $V_{bias}$. The DC line voltage for the transmission lines may be supplied with the power supply for the data transmitter 10 and/or the data receiver 20. Alternatively, the DC line voltage for the transmission lines may be supplied with an external DC line voltage independent from the power supply for the data transmitter 10 and/or the data receiver 20.

As described above, the terminal bias voltage $V_{bias}$ may be below the DC line voltage. For example, the data transmitter 10 and the data receiver 20 may operate with a voltage Vcc, also being the DC line voltage, while the terminal bias voltage $V_{bias}$ may be Vcc–ΔV, in which ΔV may be 2V for example. As such, there is a current constantly flowing through the pair of bias resistors 13 and 14 to the second voltage source 17, causing energy dissipated on the bias resistors 13 and 14 and the second voltage source 17.

Assuming that the terminal bias voltage $V_{bias}$ is 1.3V, and the current flowing through the second voltage source 17 is 14 mA, the power consumed on the second voltage source 17 is 18.2 mW. In other words, power of 18.2 mW is wasted and turned into heat.

In some embodiments, it is proposed an improved solution for recycling current in a data transmission system. The data transmission system couples a bias resistor to a load at a terminal bias voltage, such that the second voltage source 17 or similar DC terminal bias voltage sources can be eliminated from the data transmission system, and the current flowing through the bias resistor can be recycled at the load side. As such, the power that was originally consumed by the second voltage source 17 can be recycled in the load to save power and reduce heat generated in the data transmission system.

Figure 2:
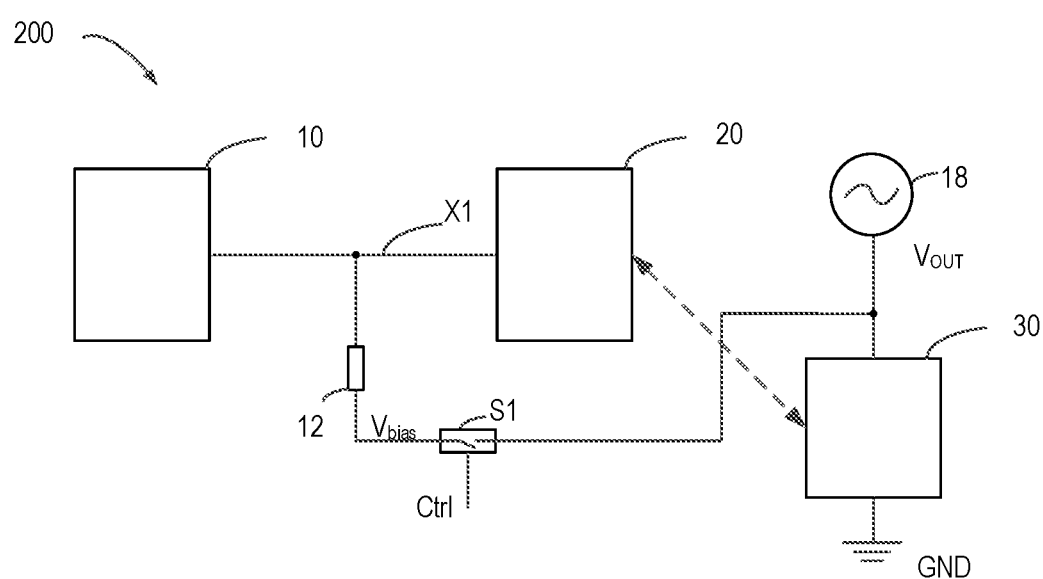
FIG. 2 illustrates a block diagram implementing an electronic device in accordance with some example embodiments of the present disclosure.

FIG. 2 illustrates a block diagram implementing an electronic device 200 in accordance with some example embodiments of the present disclosure. The electronic device 200 comprises a data transmission system comprising a data transmitter 10, a data receiver 20 and a single-end data transmission line X1 coupling the data transmitter 10 to the data receiver 20 on a circuit board. The data may be transmitted from the data transmitter 10 to the data receiver 20 via the single-end data transmission line X1.

The electronic device 200 further comprises a load 30, such as a micro controlling unit (MCU) or other electronic components. In this case, the load 30 may be directly or indirectly coupled to the data receiver 20.

The electronic device 200 further comprises a first voltage source 18 to supply a voltage $V_{OUT}$ to the load 30, such that the load 30 may operate with the supplied voltage $V_{OUT}$. In an embodiment, the first voltage source 18 may be a DC-DC converter or low dropout regulator (LDO). It should be known that the electronic device 200 may include other loads supplied with various voltages. Thus, at least one voltage converter (not shown) may be provided to convert the voltage $V_{OUT}$ from the first voltage source 18 to the various voltages and to provide the various voltages to the other loads.

The electronic device 200 further comprises a DC bias electrical connection to couple a node at the voltage $V_{OUT}$ to the bias resistor 12. Although the bias resistor 12 is illustrated, this is only for illustration without suggesting any limitation to the scopes of the disclosure herein. Other resistive devices may be applied here as well.

In an embodiment, the DC bias electrical connection may comprise a switch S1. The switch S1 may be controlled by a signal Ctrl from a MCU of the electronic device 200. In case the signal Ctrl is asserted, the switch S1 is turned on to provide the voltage $V_{OUT}$ as the terminal bias voltage to the bias resistor 12. In case the signal Ctrl is de-asserted, the switch S1 is turned off to disconnect the voltage $V_{OUT}$ from the bias resistor 12. The MCU may determine whether DC bias current flows through the single-end data transmission line X1. If the DC bias current flows through the single-end data transmission line X1, the MCU may set the signal Ctrl to be asserted. If no DC bias current flows through the single-end data transmission line X1, the MCU may set the signal Ctrl to be de-asserted.

In case that DC bias current flows through the transmission line X1, the voltage $V_{OUT}$ is provided to the bias resistor 12 as a terminal bias voltage $V_{bias}$, and in case that no DC bias current flows through the transmission lines X2 and X3, the voltage $V_{OUT}$ is not provided to the bias resistor 12. As such, it may prevent current sinks from the first voltage source 18 to the data transmitter 10 and the data receiver 20 via the single-end data transmission line X1, and it may further reduce energy dissipation. In another embodiment, the bias resistor may be directly coupled to the load 30 at the voltage $V_{OUT}$.

As described above, the terminal bias voltage $V_{bias}$ may be below the DC line voltage, but the terminal bias voltage $V_{bias}$ is greater than 0V in an embodiment. For example, the data transmitter 10 and the data receiver 20 may operate with a voltage Vcc of 3.3V, which is also the DC line voltage, while the terminal bias voltage $V_{bias}$ may be Vcc−ΔV, in which ΔV may be 2V for example, rendering the terminal bias voltage $V_{bias}$ being 1.3V.

In an embodiment, the voltage $V_{OUT}$ supplied to the load 30 equals to the terminal bias voltage $V_{bias}$ required at the bias resistor 12, or substantially equals to the terminal bias voltage $V_{bias}$ required at the bias resistor 12. Here, the expression "substantially equal to" refer to a scenario that the voltage $V_{OUT}$ may be from 90% of the terminal bias voltage $V_{bias}$ to the 110% of the terminal bias voltage $V_{bias}$. Optionally, the expression "substantially equal to" refer to a scenario that the voltage $V_{OUT}$ may be from 95% of the terminal bias voltage $V_{bias}$ to the 105% of the terminal bias voltage $V_{bias}$.

Since the voltage $V_{OUT}$ substantially equals to the terminal bias voltage $V_{bias}$ required at the bias resistor 12, it may eliminate the voltage source 17 of FIG. 1 by coupling the bias resistor 12 to a node of the voltage $V_{OUT}$. As such, an appropriate terminal bias voltage $V_{bias}$ is provide at the bias resistor 12 for biasing the DC voltage of the transmission line X1, without sacrificing energy on the voltage source 17 of FIG. 1. In addition, since various loads requiring various supply voltages are included in the electronic device 200, it is possible to select an appropriate load at the terminal bias voltage to couple to the bias resistor. In case that no bias voltage is available at any of the loads, the electronic device may comprises a voltage converter to convert the voltage $V_{OUT}$ to the terminal bias voltage $V_{bias}$, as discussed below.

In some embodiments, with the improved solution as shown in FIG. 2, current can be recycled in the data transmission system. The data transmission system couples the bias resistor 12 to the load 30 at the terminal bias voltage, such that the second voltage source 17 of FIG. 1 can be eliminated from the data transmission system, and the current flowing through the bias resistor can be recycled at the load side. As such, the power that was originally consumed by the second voltage source 17 can be recycled in the load 30 to save power and reduce heat generated in the data transmission system.

Figure 3:
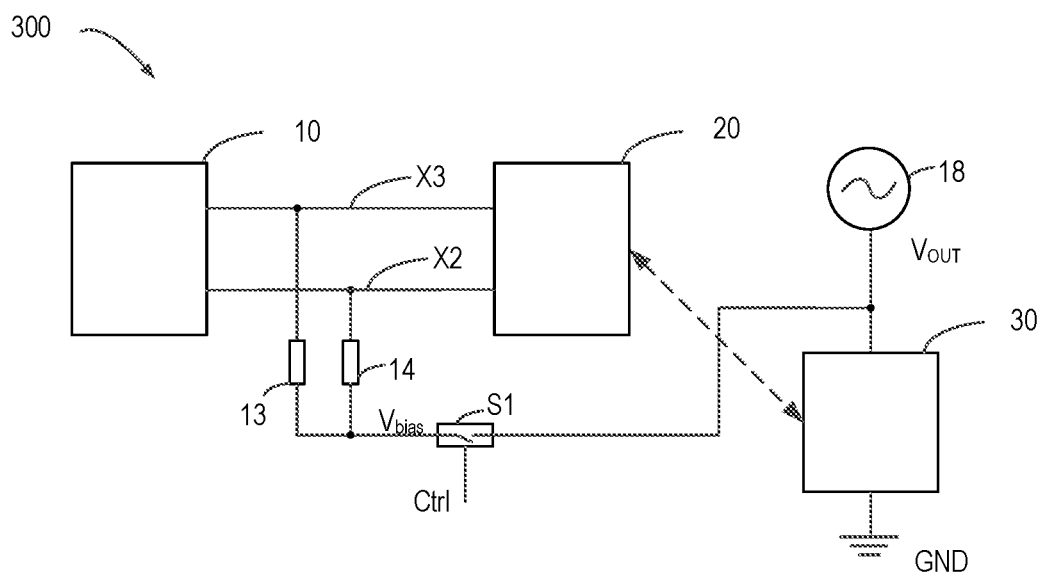
FIG. 3 illustrates a block diagram implementing an electronic device in accordance with some example embodiments of the present disclosure.

FIG. 3 illustrates a block diagram implementing an electronic device 300 in accordance with some example embodiments of the present disclosure. The electronic device 300 is analogous to the electronic device 200, and the same components with same reference numbers operate in a substantially same manner. Thus, description on the same components with same reference numbers will be omitted here for brevity.

In an embodiment, the data transmitter 10 may be a PECL driver, and the data receiver 20 may be a PECL receiver. In another embodiment, the data transmitter 10 may be a PECL driver, and the data receiver 20 may be a current mode logic (CML) receiver. In a further embodiment, the data transmitter 10 may be a low voltage differential signaling (LVDS) driver, and the data receiver 20 may be a PECL receiver. Alternatively, other data transmitters and receivers are possible as well.

As compared to the electronic device 200 of FIG. 2, the electronic device 300 employs a pair of differential data transmission lines X2 and X3 to replace the single-end data transmission line X1. Accordingly, a pair of bias resistors 13 and 14 are presented in FIG. 3 to replace the bias resistor 12 of the electronic device 200. Similarly, in the electronic device 300, the pair of bias resistors 13 and 14 are coupled to the load 30 at the terminal bias voltage, such that the second voltage source 17 of FIG. 1 can be eliminated from the data transmission system, and the current flowing through the bias resistor can be recycled at the load side. As such, the power that was originally consumed by the second voltage source 17 can be recycled in the load 30 to save power and reduce heat generated in the data transmission system.

Figure 4:
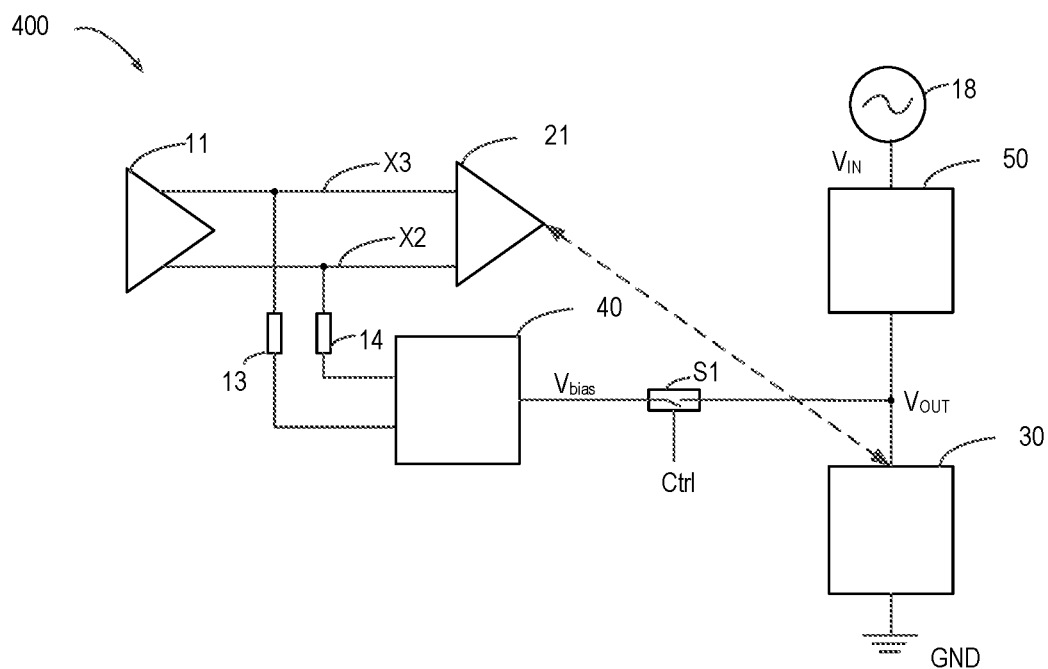
FIG. 4 illustrates a block diagram implementing an electronic device in accordance with some example embodiments of the present disclosure.

FIG. 4 illustrates a block diagram implementing an electronic device 400 in accordance with some example embodiments of the present disclosure. The electronic device 400 is analogous to the electronic device 300, and the same components with same reference numbers operate in a substantially same manner. Thus, description on the same components with same reference numbers will be omitted here for brevity.

As compared to the electronic device 300 of FIG. 3, the electronic device 400 further comprises an impedance matching network 40 between the pair of bias resistors 13 and 14 and the switch S1. The impedance matching network 40 may provide a better effect for high frequency differential communication. In addition, the first voltage source 18 generates a voltage $V_{IN}$, which is greater than the terminal bias voltage $V_{bias}$ for the bias resistors 13 and 14 and the voltage $V_{OUT}$ for the load 30. The electronic device 400 further comprises a DC-DC voltage converter 50 to convert the voltage $V_{IN}$ to the voltage $V_{OUT}$ for the load 30.

Similarly, in the electronic device 400, the pair of bias resistors 13 and 14 are coupled to the load 30 at the terminal bias voltage, such that the second voltage source 17 of FIG. 1 can be eliminated from the data transmission system, and the current flowing through the bias resistor can be recycled at the load side. As such, the power that was originally consumed by the second voltage source 17 can be recycled in the load 30 to save power and reduce heat generated in the data transmission system.

Figure 5:
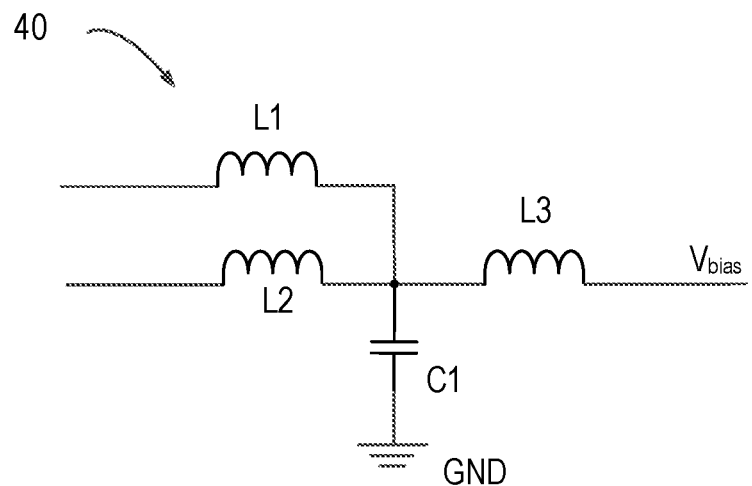
FIG. 5 illustrates an example schematics of impedance matching network in FIG. 4.

FIG. 5 illustrates an example schematics of impedance matching network 40 in FIG. 4. The impedance matching network 40 comprise a pair of ferrite beads L1 and L2 coupled to the pair of the bias resistors 13 and 14, respectively. The pair of ferrite beads L1 and L2 are coupled to a decoupling capacitor C1 and a third ferrite bead L3 coupled to the switch S1. The ferrite beads L1, L2 and L3 are configured with low DC resistance and high AC resistance to ensure the quality of high frequency differential communication. Other configurations for impedance matching network 40 are possible, as long as they can ensure the quality of high frequency differential communication.

Figure 6:
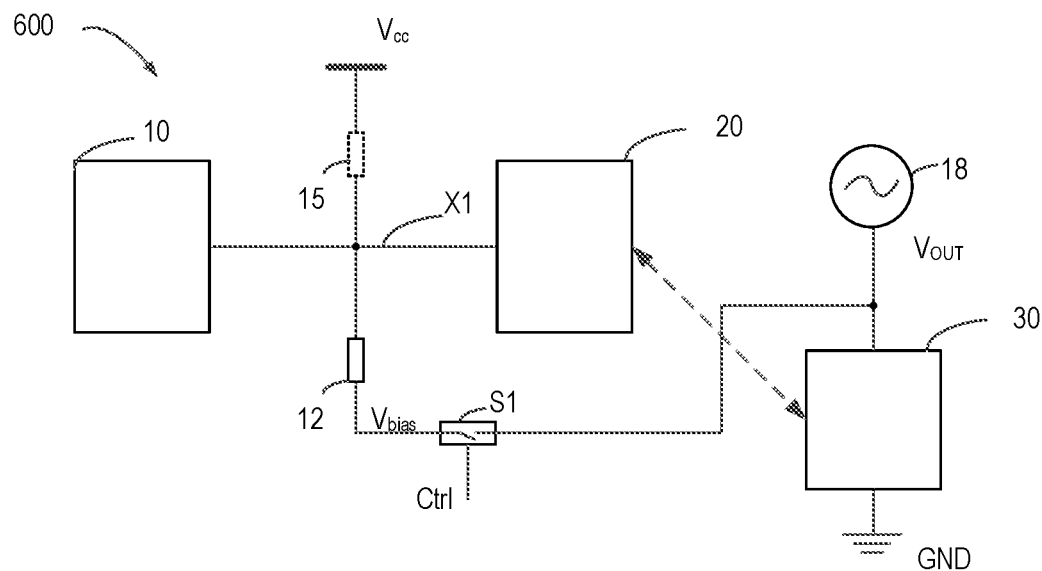
FIG. 6 illustrates a block diagram implementing an electronic device in accordance with some example embodiments of the present disclosure.

FIG. 6 illustrates a block diagram implementing an electronic device 600 in accordance with some example embodiments of the present disclosure. The electronic device 600 is analogous to the electronic device 200, and the same components with same reference numbers operate in a substantially same manner. Thus, description on the same components with same reference numbers will be omitted here for brevity.

As compared to the electronic device 200 of FIG. 2, the electronic device 600 employs an external voltage source (not shown) to provide an external voltage Vcc. In case that the external Vcc is suitable for the line voltage of the single-end data transmission line X1, the voltage Vcc may be directly provided to the single-end data transmission line X1. Alternatively, in case that the external Vcc is greater than the line voltage required by the single-end data transmission line X1, the voltage Vcc may be provided to the single-end data transmission line X1 via a dividing resistor 15.

The dividing resistor 15 and the bias resistor 12 together form a voltage divider between the voltage Vcc and the terminal bias voltage $V_{bias}$ to generate an suitable voltage at the data transmission line X1. Similarly, in the electronic device 600, the bias resistor 12 is coupled to the load 30 at the terminal bias voltage, such that the second voltage source 17 of FIG. 1 can be eliminated from the data transmission system, and the current flowing through the bias resistor 12 can be recycled at the load side. As such, the power that was originally consumed by the second voltage source 17 can be recycled in the load 30 to save power and reduce heat generated in the data transmission system.

Figure 7:
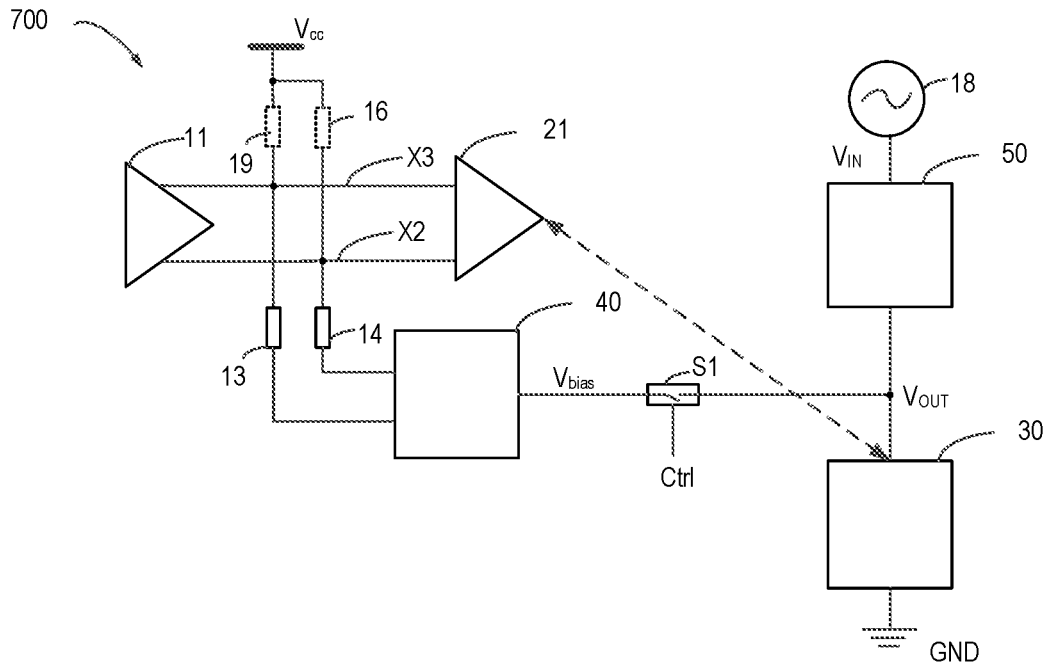
FIG. 7 illustrates a block diagram implementing an electronic device in accordance with some example embodiments of the present disclosure.

FIG. 7 illustrates a block diagram implementing an electronic device in accordance with some example embodiments of the present disclosure. The electronic device 700 is analogous to the electronic device 600, and the same components with same reference numbers operate in a substantially same manner. Thus, description on the same components with same reference numbers will be omitted here for brevity.

As compared to the electronic device 600 of FIG. 6, the electronic device 700 employs a pair of differential data transmission lines X2 and X3 to replace the single-end data transmission line X1. Accordingly, a pair of bias resistors 13 and 14 are presented in FIG. 7 to replace the bias resistor 12 of the electronic device 600, and a pair of dividing resistors 16 and 19 are presented in FIG. 7 to replace the dividing resistor 15 of the electronic device 600.

As compared to the electronic device 600 of FIG. 6, the electronic device 700 further comprises an impedance matching network 40 between the pair of bias resistors 13 and 14 and the switch S1. The impedance matching network 40 may provide a better effect for high frequency differential communication. In addition, the first voltage source 18 generates a voltage $V_{IN}$, which is greater than the terminal bias voltage $V_{bias}$ for the bias resistors 13 and 14 and the voltage $V_{OUT}$ for the load 30. The electronic device 700 further comprises a DC-DC voltage converter 50 to convert the voltage $V_{IN}$ to the voltage $V_{OUT}$ for the load 30.

Similarly, in the electronic device 700, the pair of bias resistors 13 and 14 are coupled to the load 30 at the terminal bias voltage, such that the second voltage source 17 of FIG. 1 can be eliminated from the data transmission system, and the current flowing through the bias resistors 13 and 14 can be recycled at the load side. As such, the power that was originally consumed by the second voltage source 17 can be recycled in the load 30 to save power and reduce heat generated in the data transmission system.

Figure 8:
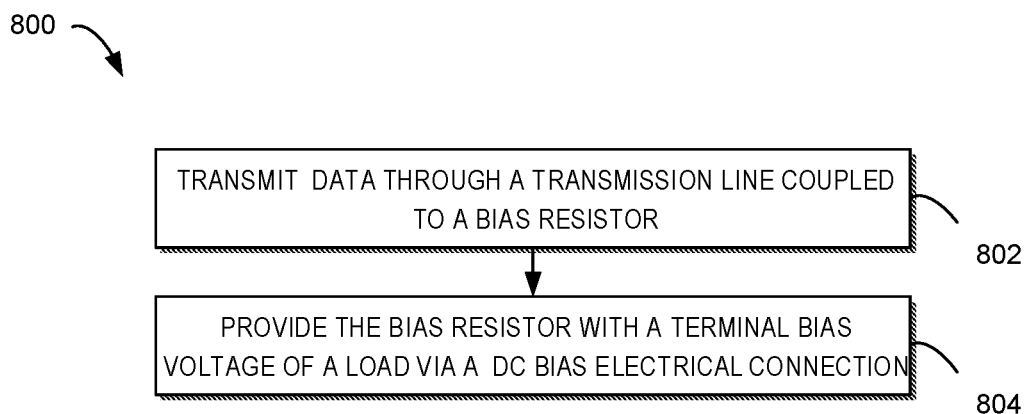
FIG. 8 is flowchart illustrating a method for recycling current in a data transmission system in accordance with some example embodiments of the present disclosure.

FIG. 8 is flowchart illustrating a method 800 for recycling current in an electronic device in accordance with some example embodiments of the present disclosure. The electronic device of FIG. 8 may be the electronic devices 200, 300, 400, 600 or 700 in an embodiment. Thus, the features described with reference to FIGS. 2-7 may be applied to the method 800 of FIG. 8.

In 802, it is provided to transmit data through a transmission line coupled to a bias resistor. In 804, it is provided to provide, in response to current flowing through the transmission line, the bias resistor with a terminal bias voltage at a load via a DC bias electrical connection.

Figure 9:
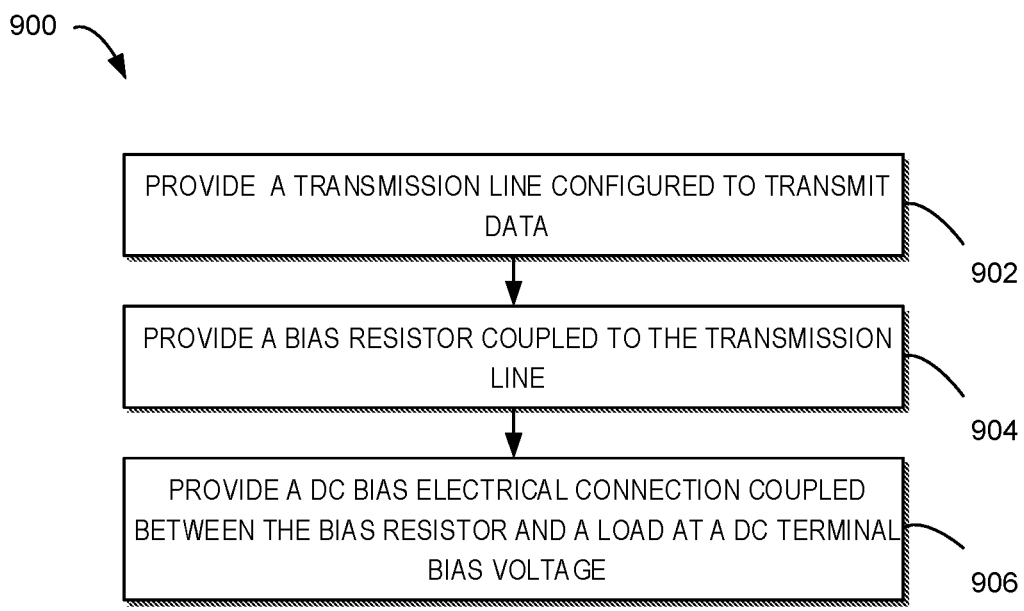
FIG. 9 is flowchart illustrating a method for manufacturing an electronic device in accordance with some example embodiments of the present disclosure.

FIG. 9 is flowchart illustrating a method for manufacturing an electronic device in accordance with some example embodiments of the present disclosure. The electronic device of FIG. 9 may be the electronic devices 200, 300, 400, 600 or 700 in an embodiment. Thus, the features described with reference to FIGS. 2-7 may be applied to the method 900 of FIG. 9.

In 902, it is provided a transmission line configured to transmit data. In 904, it is provided a bias resistor coupled to the transmission line. In 906, it is provided a switch coupled between the bias resistor and a load at a terminal bias voltage. The switch is configured to be turned on to provide the bias resistor with the terminal bias voltage during data transmission through the transmission line.

Hereinafter, some example implementations of the subject matter described herein will be listed.

Item 1. It is provided an electronic device. The electronic device comprises a transmission line, a bias resistor and a DC bias electrical connection. The transmission line is configured to transmit data. The bias resistor is coupled to the transmission line. The DC bias electrical connection is coupled between the bias resistor and a load at a terminal bias voltage. The DC bias electrical connection is configured to provide the bias resistor with the terminal bias voltage during data transmission through the transmission line.

Item 2. The electronic device of Item 1, wherein the DC bias electrical connection comprises a switch. The switch is configured to be turned on in case that DC bias current flows through the transmission line, and the switch is further configured to be turned off in case that no DC bias current flows through the transmission line.

Item 3. The electronic device of any of Items 1-2, wherein the switch comprises an analog switch.

Item 4. The electronic device of any of Items 1-3, further comprising an impedance matching network coupled between the switch and the bias resistor.

Item 5. The electronic device of any of Items 1-4, wherein the transmission line comprises a pair of differential data transmission lines, the pair of differential data transmission lines comprising a first differential data transmission line and a second differential data transmission line; and the bias resistor comprises a first resistor coupled between the first differential data transmission line and the switch and a second resistor coupled between the second differential data transmission line and the switch.

Item 6. The electronic device of any of Items 1-5, further comprising a data transmitter; and a data receiver coupled to the data transmitter via the pair of differential data transmission lines.

Item 7. The electronic device of any of Items 1-6, wherein the data transmitter comprises a positive emitter-coupled logic (PECL) driver or a low voltage differential signaling (LVDS) driver; and the data receiver comprises a PECL receiver or a current mode logic (CML) receiver.

Item 8. The electronic device of any of Items 1-7, further comprising a voltage dividing resistor coupled between a power supply and the transmission line.

Item 9. The electronic device of any of Items 1-8, further comprising: a first voltage dividing resistor coupled between a power supply and the first differential data transmission line; and a second voltage dividing resistor coupled between a power supply and the second differential data transmission line.

Item 10 The electronic device of any of Items 1-9, wherein the terminal bias voltage is greater than 0 V.

Item 11. The electronic device of any of Items 1-10, wherein the data transmitter and the data receiver are mounted on a circuit board, with the transmission line coupling, on the circuit board, the transmitter to the data receiver.

Item 12. It is provided a method for recycling current in data transmission. The method comprises transmitting data through a transmission line coupled to a bias resistor; and providing the bias resistor with a terminal bias voltage of a load via a DC bias electrical connection.

Item 13. The method of Item 12, further comprising turning on, in response to transmitting the data, a switch of the DC bias electrical connection coupled between the bias resistor and the load to provide the bias resistor with the terminal bias voltage.

Item 14. It is provided a method for manufacturing an electronic device. The method comprises providing a transmission line configured to transmit data; providing a bias resistor coupled to the transmission line; and providing a DC bias electrical connection coupled between the bias resistor and a load at a terminal bias voltage. The DC bias electrical connection is configured to provide the bias resistor with the terminal bias voltage in case that DC bias current flows through the transmission line.

Item 15. The method of Claim 14, wherein providing a DC bias electrical connection comprises providing a switch. The switch is configured to be turned on in case that DC bias current flows through the transmission line. The switch is further configured to be turned off in case that no data flows through the transmission line.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. On the other hand, various features that are described in the context of a single embodiment may also be implemented in multiple embodiments separately or in any suitable subcombination.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An electronic device comprising:
a transmission line configured to transmit data;
a bias resistor coupled to the transmission line; and
a DC bias electrical connection coupled between the bias resistor and a load at a terminal bias voltage, the DC bias electrical connection configured to provide the bias resistor with the terminal bias voltage during data transmission through the transmission line.

2. The electronic device of claim 1, wherein the DC bias electrical connection comprises a switch, the switch configured to be turned on in case that DC bias current flows through the transmission line, and the switch further configured to be turned off in case that no DC bias current flows through the transmission line.

3. The electronic device of claim 2, wherein the switch comprises an analog switch.

4. The electronic device of claim 2, further comprising an impedance matching network coupled between the switch and the bias resistor.

5. The electronic device of claim 2, wherein the transmission line comprises a pair of differential data transmission lines, the pair of differential data transmission lines comprising a first differential data transmission line and a second differential data transmission line; and
the bias resistor comprises a first resistor coupled between the first differential data transmission line and the switch and a second resistor coupled between the second differential data transmission line and the switch.

6. The electronic device of claim 5, further comprising a data transmitter; and
a data receiver coupled to the data transmitter via the pair of differential data transmission lines.

7. The electronic device of claim 6, wherein the data transmitter comprises a positive emitter-coupled logic (PECL) driver or a low voltage differential signaling (LVDS) driver; and
the data receiver comprises a PECL receiver or a current mode logic (CML) receiver.

8. The electronic device of claim 6, wherein the data transmitter and the data receiver are mounted on a circuit board, with the transmission line coupling, on the circuit board, the transmitter to the data receiver.

9. The electronic device of claim 5, further comprising:
a first voltage dividing resistor coupled between a power supply and the first differential data transmission line; and
a second voltage dividing resistor coupled between the power supply and the second differential data transmission line.

10. The electronic device of claim 1, wherein the terminal bias voltage is greater than 0 V.

11. The electronic device of claim 1, further comprising a voltage dividing resistor coupled between a power supply and the transmission line.

12. A method for recycling current in data transmission, comprising:
transmitting data through a transmission line coupled to a bias resistor; and
providing the bias resistor with a terminal bias voltage of a load via a DC bias electrical connection.

13. The method of claim 12, further comprising
turning on, in response to transmitting the data, a switch of the DC bias electrical connection coupled between the bias resistor and the load to provide the bias resistor with the terminal bias voltage.

14. A method for manufacturing an electronic device, comprising:
providing a transmission line configured to transmit data;
providing a bias resistor coupled to the transmission line; and
providing a DC bias electrical connection coupled between the bias resistor and a load at a terminal bias voltage, the DC bias electrical connection configured to provide the bias resistor with the terminal bias voltage during data transmission through the transmission line.

15. The method of claim 14, wherein providing a DC bias electrical connection comprises providing a switch, the switch configured to be turned on in case that DC bias current flows through the transmission line, and the switch further configured to be turned off in case that no DC bias current flows through the transmission line.

* * * * *